(12) United States Patent
Iwaki (10) Patent No.: US 9,154,702 B2
(45) Date of Patent: Oct. 6, 2015

(54) IMAGING METHOD INCLUDING SYNTHESIZING SECOND IMAGE IN AREA OF SCREEN THAT DISPLAYS FIRST IMAGE

(71) Applicant: Dwango Co., Ltd., Tokyo (JP)

(72) Inventor: Shinnosuke Iwaki, Tokyo (JP)

(73) Assignee: Dwango Co., Ltd. (JP)

( * ) Notice: Subject to any disclaimer, the term of this patent is extended or adjusted under 35 U.S.C. 154(b) by 156 days.

(21) Appl. No.: 13/739,245

(22) Filed: Jan. 11, 2013

(65) Prior Publication Data

US 2013/0215312 A1    Aug. 22, 2013

(30) Foreign Application Priority Data

Jan. 13, 2012   (JP) .................................. 2012-005546
Dec. 6, 2012   (JP) .................................. 2012-267323

(51) Int. Cl.
*H04N 5/222*   (2006.01)
*H04N 5/232*   (2006.01)
*H04N 5/74*    (2006.01)
*G03B 17/54*   (2006.01)

(52) U.S. Cl.
CPC ........... *H04N 5/23293* (2013.01); *H04N 5/222* (2013.01); *H04N 5/74* (2013.01); *G03B 17/54* (2013.01)

(58) Field of Classification Search
None
See application file for complete search history.

(56) References Cited

U.S. PATENT DOCUMENTS

| 6,290,359 | B1 * | 9/2001 | Shriver ........................... 353/28 |
| 6,361,173 | B1 * | 3/2002 | Vlahos et al. ................... 353/97 |
| 7,136,090 | B1 * | 11/2006 | McDuffie White ........ 348/14.16 |
| 2005/0068501 | A1 * | 3/2005 | Nonaka et al. .................. 353/30 |
| 2005/0180631 | A1 * | 8/2005 | Zhang et al. ................... 382/173 |
| 2008/0316348 | A1 * | 12/2008 | Hallock ..................... 348/333.1 |
| 2010/0277576 | A1 * | 11/2010 | Fattal et al. ..................... 348/54 |
| 2011/0254860 | A1 * | 10/2011 | Zontrop et al. ............... 345/633 |
| 2011/0256914 | A1 * | 10/2011 | Ahdoot ............................. 463/8 |

FOREIGN PATENT DOCUMENTS

JP        2007-282110 A    10/2007

* cited by examiner

*Primary Examiner* — Roberto Velez
*Assistant Examiner* — Quan Pham
(74) *Attorney, Agent, or Firm* — Harness, Dickey & Pierce, P.L.C.

(57) ABSTRACT

Since an image projected from a projector has basically not high quality due to degradation of brightness and mixture of outside light, the image shot by the conventional technology includes the projected image with basically not high quality. In order to solve the above deficiency, in an aspect of the present invention provides an image system, where live performance is provided to audience by image projection on the screen, and the image to be shot does not include the projected image with low quality. For example, the image system can later synthesize a high-quality image having the same content as the projected image.

16 Claims, 11 Drawing Sheets

IMAGING METHOD INCLUDING SYNTHESIZING SECOND IMAGE IN AREA OF SCREEN THAT DISPLAYS FIRST IMAGE

BACKGROUND OF THE INVENTION

1. Field of the Invention

The present invention relates to a technology for appropriately shooting by an imager an area including a screen, on which an image is projected.

2. Description of the Related Art

Currently, a technology for staging, where a semi-transparent screen is placed on a stage and a projector projects a character image such as a 3D animation, such that the character really exists on the stage, is provided. Moreover, by using such technology, a virtual music live performance, where a virtual vocalist image is projected on the stage, and singing voice data is outputted accompanying of performance by a live band or karaoke, is held. Moreover, such event is shot by an imager (camera), and is distributed to a user's terminal via the network, or is recorded on media such as a DVD and is sold.

Moreover, in Unexamined Japanese Patent Application Publication No, 2007-282110, a technology of an imaging system for projected image to appropriately shoot the stage including the projected image flour the projector using the imager is disclosed. Specifically, as an example of the imaging system for the projected image, by utilizing a half mirror, the projector and the imager are placed, such that optical axes of the projector and the imager are orthogonally crossed for shooting without calibration of optical direction and distance of the projector and the imager. However, in the above configuration, unnecessary image by the projected light (e.g., images by the projected light reflecting off objects scattered around the shooting location other than the projection screen) other than the projected image as a shooting target is inputted into the imager depending, on transmittance and reflectance rate of the half mirror. Therefore, in Unexamined Japanese Patent Application Publication No. 2007-282110, in order to exclude such unnecessary projected image, an image input/output device, where two linear polarization filters etc. are placed on a predetermined optical path, such that the projected light reflected from the object other than the screen does not come into the imager after passing through or reflecting off the half mirror, is disclosed.

RELATED ART DOCUMENTS

Patent Document: Unexamined Japanese Patent Application Publication No. 2007-282110

However, the image projected on the screen from the projector is basically not high equality. The reason is that the projected image is an image reflected off the screen, so that brightness of the image is degraded due to absorption or diffusion of the light upon the reflection. Moreover, the screen reflects light such as outside light other than the fight of the projected image, so that the projected image and the outside light are mixed.

Therefore, in the above conventional technology, the image shot by the imager includes the projected image with basically not high quality.

SUMMARY OF THE INVENTION

In order to solve the above deficiency, in an aspect of the present invention provides an image system, where live performance is provided to audience by image projection on the screen, and the image to be shot does not include the projected image with low quality. For example, the image system can later synthesize a high-quality image having the same content as the projected image. Specifically, an aspect of the present invention provides an image system, comprising a projector projecting an image, a screen displaying the image from the projector; and an imager capable of shooting an area, including the screen through a filter preventing transmission of the image displayed on the screen.

Moreover, in order to prevent the transmission of the projected image of the screen, in another aspect of the present invention provides an image system on the basis of the above configuration, further comprising an intermittent projector intermittently projecting the image oil the screen, wherein the filter of the imager is a first filter unit having a shutter function of shooting the area including the screen only at a non-projection timing for the intermittently projected image. Moreover, an image system on the basis of the above configuration, wherein the image projected on the screen is polarized under a first condition, and the filter of the imager is a second filter unit, that allows only transmission of polarization under a second condition, not under the first condition is provided.

Moreover, in another aspect of the present invention provides an image system on the basis of the above configuration, wherein the screen is at least partially metal or is coated with metal powder paint. Moreover, an image system, wherein the screen is semi-transmissive screen, is provided.

Moreover, in another aspect of the present invention provides an image system on the basis of the above configuration, further comprising a synthesizer synthesizing the image in the area of the screen taken by the imager. Moreover, the image system, wherein the synthesizer further comprises a synthesizing section for image having same content synthesizing an image having a same content as the image from the projector, is provided.

Moreover, in another aspect of the present invention provides an image system, wherein the screen is a half mirror that partially reflects or partially transmits incoming light. Moreover, the image system may have a configuration, where the projector projecting the image on the half mirror is a display monitor displaying the image, so that high-quality projection image can be projected on the stage.

According to the present invention having the above configuration, it is possible to shoot the stage without low-quality projected image projecting the image on the stage. Therefore, it is possible to synthesize higher-quality projected image etc. with the shot image keeping live atmosphere by the projected image.

DESCRIPTION OF THE PREFERRED EMBODIMENTS

Hereinafter; embodiments of the present invention will be described with reference to diagrams. The present invention is not to be limited to the above embodiments and able to be embodied in various forms without departing from the scope thereof.

The first embodiment will mainly describe Claims 1 to 5, and 10. The second embodiment will mainly describe Claims 8 and 9. The third embodiment will mainly describe Claims 6 and 7.

<<First Embodiment>>
<Outline of First Embodiment>

Figure 1:
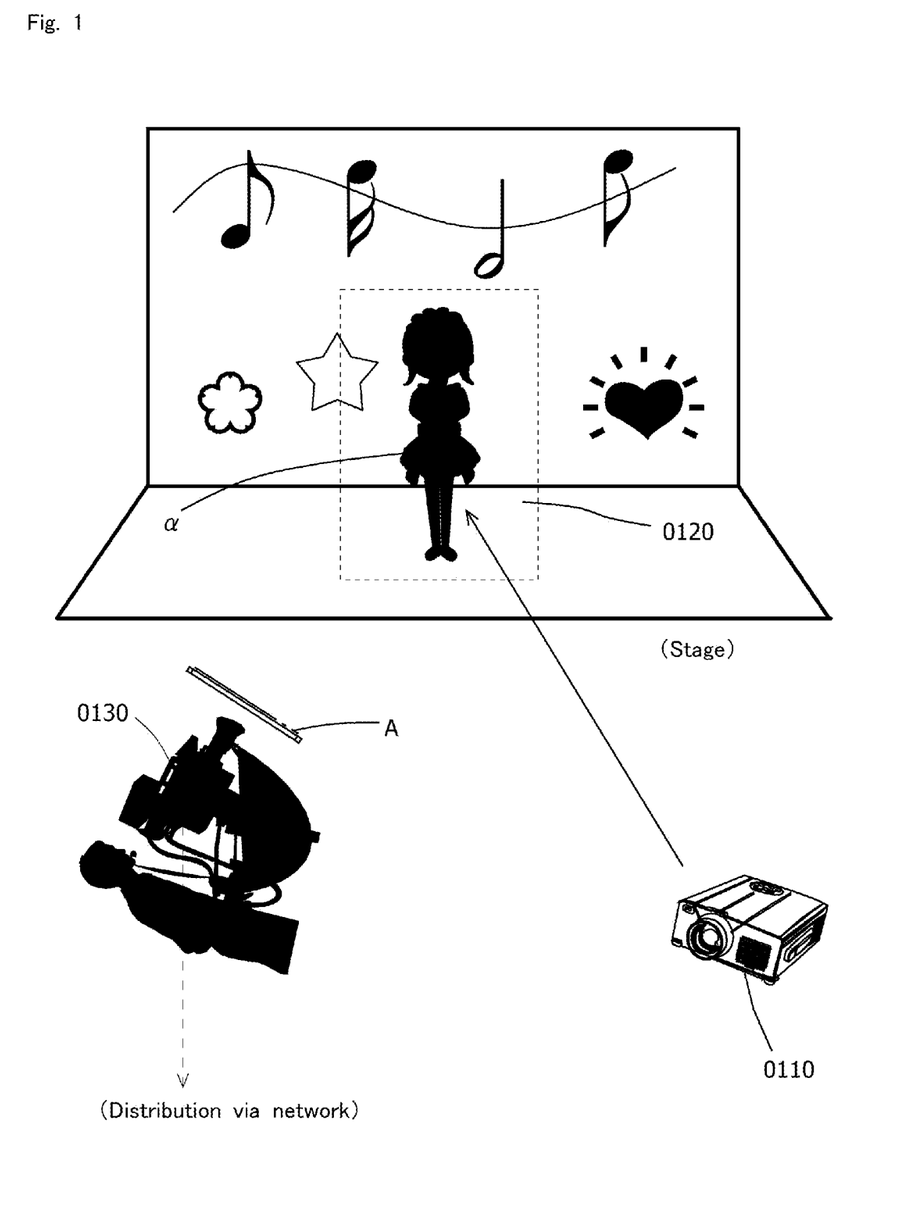
FIG. 1 is a conceptual diagram exemplifying shooting by an image system of a first embodiment.

FIG. 1 is a conceptual diagram exemplifying shooting by an image system of a first embodiment. As shown in FIG. 1, a screen 0120 for projecting an image is placed on the stage, and an image α is projected thereon from a projector 0110. Therefore, the audience staying there can enjoy performance of the projected image and staging for the performance.

The area including the stage is shot by an imager 0130, and the shot image is provided to user's terminals via the network by streaming distribution. Here, the projector 0110 intermittently projects at a predetermined period, and an active shutter A, which open/close in synchronization with intermittently projecting the image by the projector, is placed, for example, on the front side of a lens of the imager 0130. Therefore, the projector and the imager are controlled, such that at a projection timing of the image by the projector, the shutter in the front side of the imager closes, thereby stopping shooting, and at a shooting timing of the imager, the projector does not cairn out projection, thereby shooting an image without the projected image shown in FIG. 2.

Figure 2:
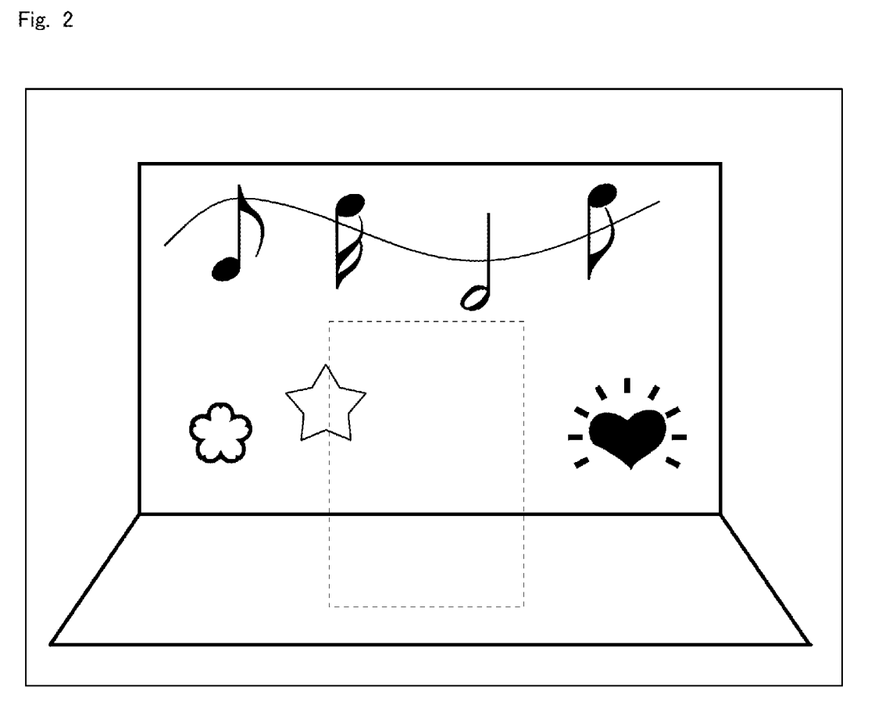
FIG. 2 is a diagram exemplifying an image shot by the image system of the first embodiment.

Subsequently, for example by synthesizing an image data having the same content as the projected image with the shot image, it is possible to distribute an image including projected image without degradation of image quality due to projection and reflection etc. to a user's terminal. Moreover, it is possible to provide different type of image to the audience and to the viewer viewing the image on the user's terminal via the network.

<Functional Configuration of First Embodiment>

Figure 3:
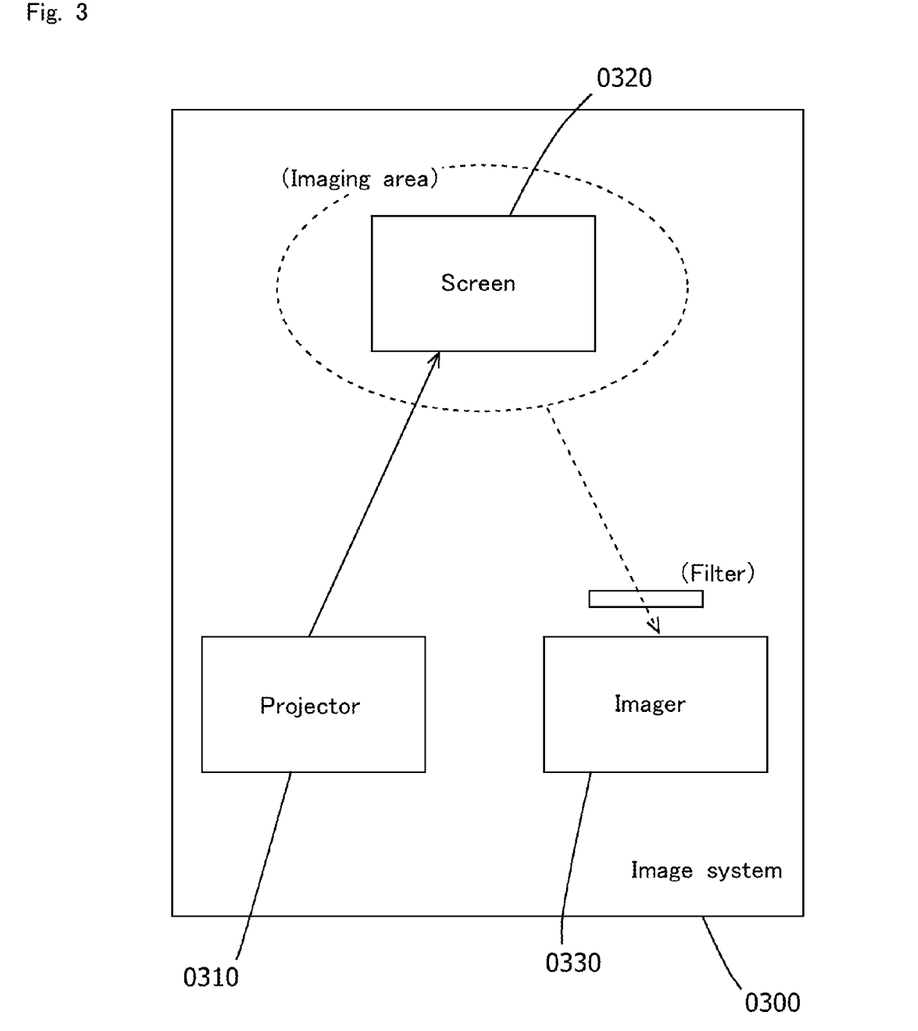
FIG. 3 is a functional block diagram of the image system of the first embodiment.

FIG. 3 is a functional block diagram of the image system of the first embodiment. Note that, the following functional block of the system and of the respective components of the system can be implemented by a combination of a hardware and a software. Specifically, in the case of utilizing a computer, examples of the hardware and software include hardware components configured by a CPU, a main memory, a bus, a secondary storage device (e.g., a hard disk or a non-volatile memory, a storage media such as CD or MID, or a reading drive for the above media), an input device for inputting information, a printing device, a display device, other peripheral devices; and interfaces for the other peripheral devices and a communication interface; and driver program for controlling the above hardware, other application programs, and art application for user interface. The CPU executes an operation in accordance with the program developed on the main memory, so that processing and storing of the data, inputted through the input device or the interface etc. and stored in the memory of the hard disk, are executed, and instructions to control the hardware and software are generated. Moreover, the functional block of the system may be implemented by a specialized hardware. Moreover, the respective components of the system may be configured by physically independent apparatuses, or an apparatus, physically regarded as one apparatus, has functions to implement a plurality of apparatuses.

Moreover, the present invention can be implemented not only as a system but also as a method thereof. Moreover, a portion of such inventions may be configured as software. Furthermore, a software product used for causing a computer to execute such software, and the recording medium, in which the software is installed, should be included in the technical scope of the present invention (the same applies throughout the entire specification).

As shown in FIG. 3, an 'image system' 0300 of the first embodiment comprises a 'projector' 0310, a 'screen' 0320, and an 'imager' 0330.

The 'projector' 0310 has a function of projecting an image, and displays the image on the screen. Specifically, the projector can be implemented by various projection machines and cinema projectors.

The 'screen' 0320 has a function of displaying the image from the projector, and its material and shape are not limited. Examples of the materials include a paper, a cloth, a metal board, a metal cloth woven by metal fiber, or a screen the metal or cloth screen coated with metal powder paint. The screen is at least partially metal or is coated with metal powder paint, so that it is possible to maintain the polarization plane upon reflection without change when the projected image light is polarized. Note that, in view of maintenance ability of the polarization plane upon reflection, material having high regular reflectance such as aluminum or silver may be used as suitable material for the metal fiber or metal powder paint, and the material is not limited to these examples. When the after-mentioned filter for preventing transmission of projected image is configured by two types of orthogonally-crossed polarization filters, it is possible to improve transmission prevention of the polarization filter by utilizing such metal material for the screen.

Moreover, the screen may be semi-transmissive screen. When using the semi-transmissive screen, the audience can view an object behind the screen, or the imager can shoot the object, so that it is possible to increase the reality of the scene including the projected image.

Moreover, in the present invention, when the projector directly projects the image on the space without using the screen the screen can be omitted.

The 'imager' has a function of shooting an area including the screen through a filter, and can be configured, for example, by placing the filter in a lens or a lens barrel of a camera capable of shooting a still picture or movie, or by placing the filter in the front side of the lens. The 'filter' prevents transmission of the image projected Oil the screen.

Specifically, for example, when the image projected from the projector is expressed by simple color or small number of colors, the filter can be implemented by a color filter for preventing transmission of the target color, or software for removing the target color from the image signal or the shot image. This makes it possible to recognize the projected image with simple color or small number of colors while removing the projected image from the shot image.

Figure 4:
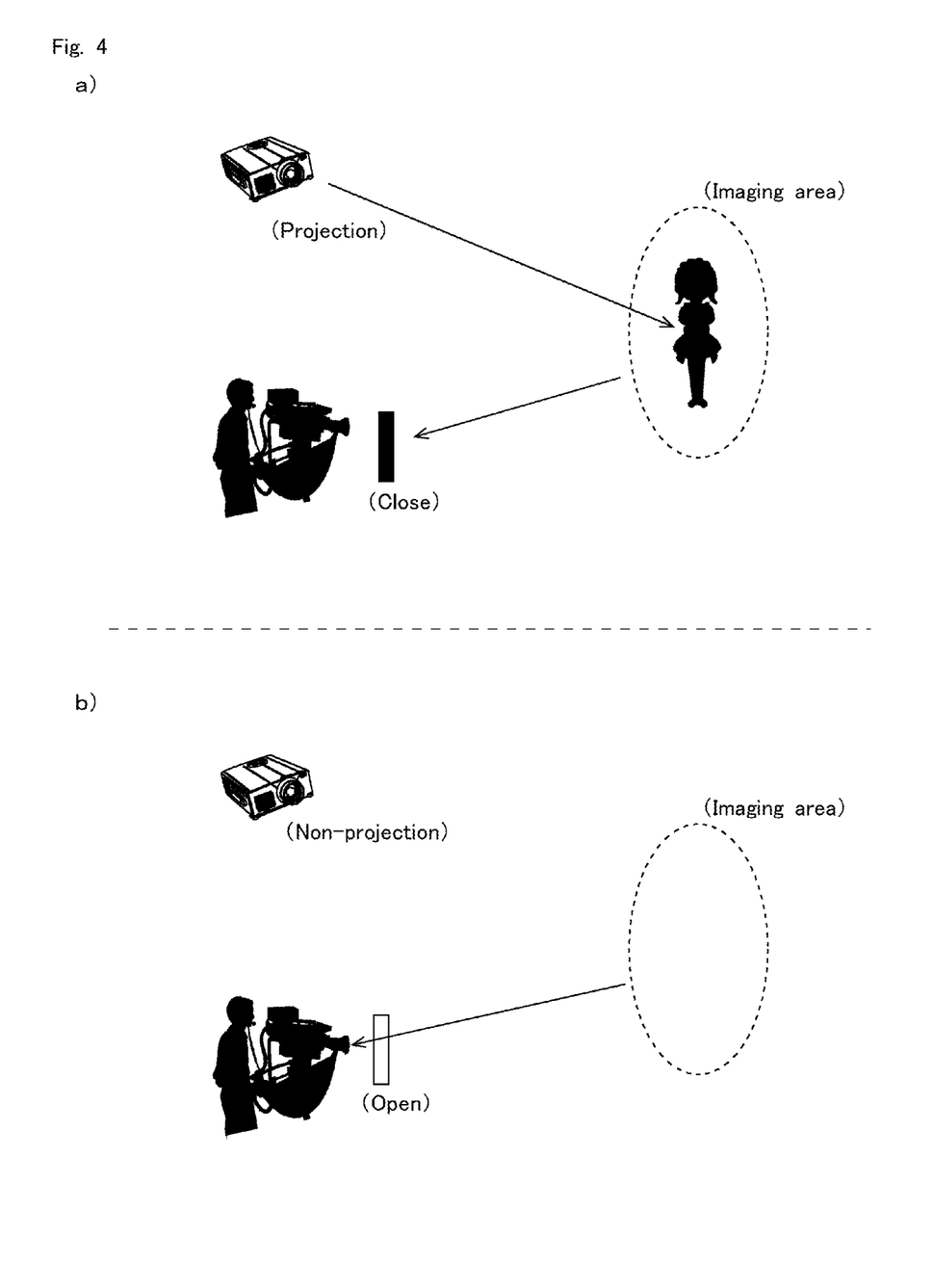
FIG. 4 is a diagram exemplifying shooting when a filter of the image system of the first embodiment is a first filter unit having a shutter function.

Moreover, as shown in the outline, the projector may comprise an intermittent projector for intermittently projecting the image on the screen, and this 'filter' is a first filter unit having a shutter function of shooting the area including the screen only at a non-projection timing of the intermittently projected image. According to this configuration, as shown in FIG. 4(a), at a projection timing of the image by the projector, the shutter of the filter of the imager closes, thereby stopping shooting. Meanwhile, as shown in FIG. 4(b), at a non-projection timing of the image by the projector, the shutter of the filter of the imager opens, thereby enabling shooting. Note that it is preferable to make this intermittent cycle short in order to maintain the image quality.

Moreover, in the above configuration, the number of frames of the shot images becomes half of normal shooting. Therefore, a configuration, where twice of frames are preliminarily taken 0.35 (e.g., the number of frames is increased from 0 fps to 0.6 fps), and frames including no image are deleted, thereby generating image data of 30 fps may be used. Moreover, as to the frames including no image, it is possible to estimate image content from the image data of preceding or subsequent frame, thereby generating and inserting interpolated frame image.

Figure 5:
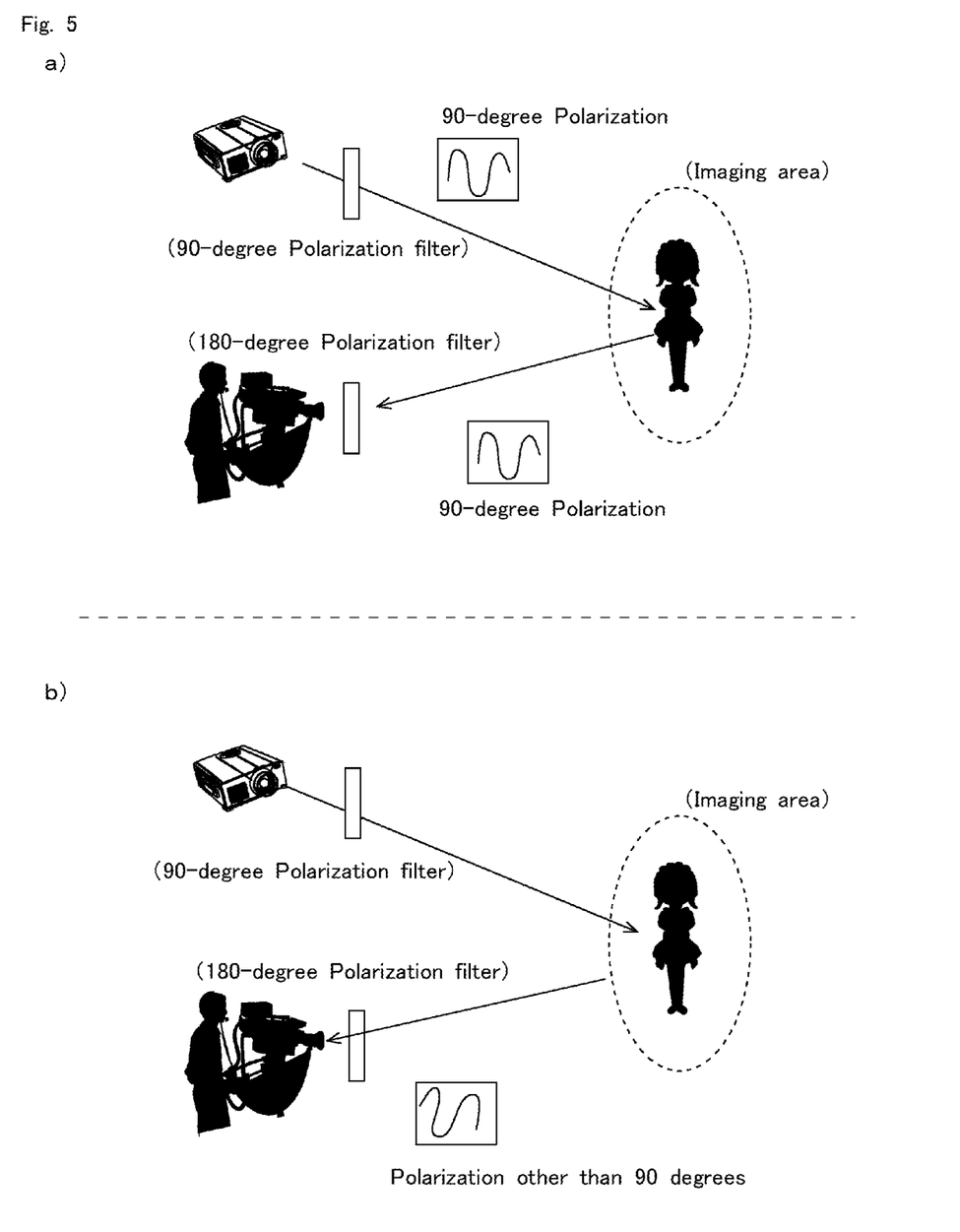
FIG. 5 is a diagram exemplifying shooting when a filter of the image system of the first embodiment is a second filter unit having a polarization filter.

Moreover, other than the shutter function, it is possible to prevent the transmission of image on the screen by using the polarization filter. Specifically, the image on the screen is polarized under the first condition, and the filter of the imager can be implemented as a second filter unit that allows only transmission of polarization under a second condition, not under the first condition. In this case, for example, a 90-degree polarization filter is placed in front of the projection lens of the projector, such that the image is projected by light of 90-degree polarization plane. When the screen is metal screen and its polarization plane upon reflection shows little variation, as shown in FIG. 5(a) a 180-degree polarization filter is placed in front of the projector, the projected image by the 90-degree polarized light cannot pass through. Meanwhile, as shown in FIG. 5(b), since other objects reflects natural light and illumination light having various polarization planes, it is possible to shoot the object passing through the 180-degree filter by the imager.

As described above, according to the image system of the first embodiment, it is possible to project the image on the screen placed on the stage, and to shoot the stage preventing the projection image of low quality from coming into the image.

<Processing Flow of First Embodiment>

Figure 6:
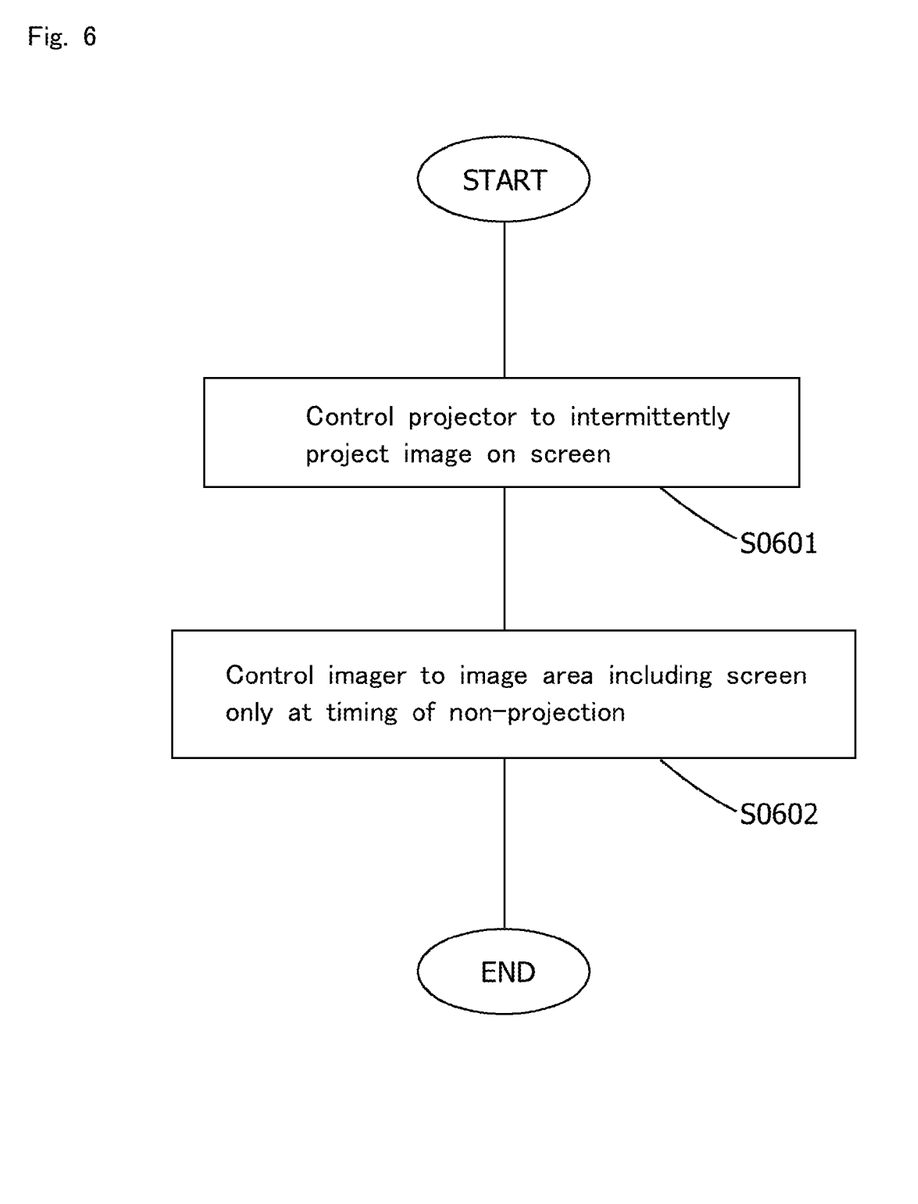
FIG. 6 is a flowchart of the image system of the first embodiment.

FIG. 6 is a flowchart of the image system of the first embodiment. Note that, the following step may be executed by the respective hardware configurations of a computer as above, or may configure a program, which is stored in a medium and is for controlling the computer.

As shown in FIG. 6, at the outset, the projector is controlled to intermittently project the image on the screen placed on the stage (a step S0601). Subsequently, the imager is controlled to shoot an area including the screen only at a non-projection timing for the intermittently projected image (a step S0602).

<Effects of First Embodiment>

According to the image system of the first embodiment, it is possible to project the image on the screen placed on the stage, and to shoot the stage preventing the projection image of low quality from coming into the image. Accordingly, while keeping the live atmosphere by the projected image, it is possible to synthesize other image with the shot image, thereby generating more beautiful image, or generating a different scene.

<<Second Embodiment>>

<Outline of Second Embodiment>

A second embodiment is on the basis of the above embodiment, and is an image system, where the image without the projected image on the screen is synthesized with an image having a different or the same content as the projected image.

<Functional Configuration of Second Embodiment>

Figure 7:
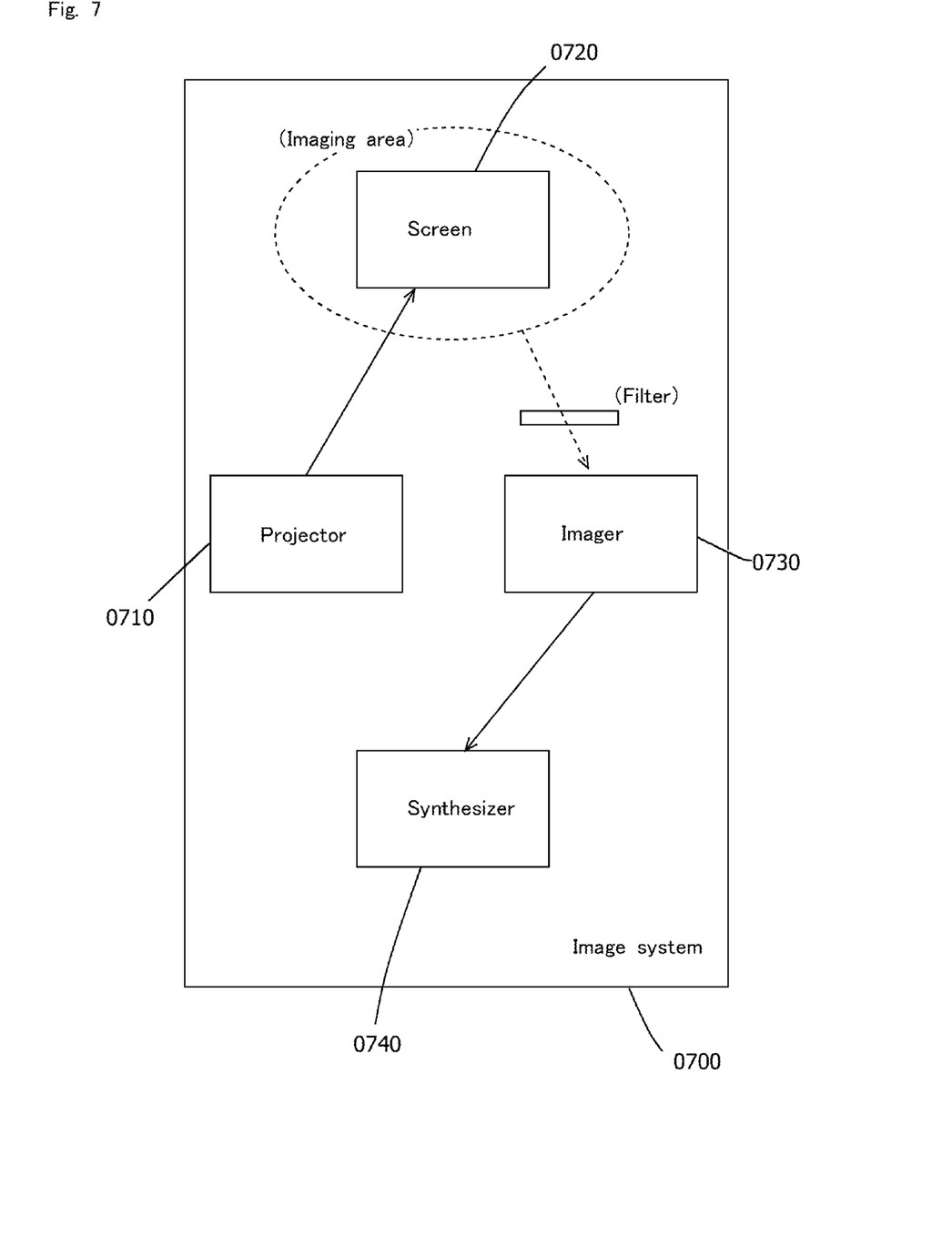
FIG. 7 is a functional block diagram of an image system of a second embodiment.

FIG. 7 is a functional block diagram of an image system of a second embodiment. As shown in FIG. 7, an 'image system' 0700 of the second embodiment is on the basis of the first embodiment and comprises a 'projector' 0710, a 'screen' 0720, and an 'imager' 0730. The image system of the second embodiment further comprises a 'synthesizer' 0740.

The 'synthesizer' 0740 has a function of synthesizing the image in the area of the screen taken by the imager, and can be implemented by a specialized computer having the function. Moreover, the synthesizer may be implemented by being installed as a software or a specialized hardware in a camera as an imager, or when distributing the shot image to the user's terminal via the network, by being installed as a software or a specialized hardware in the user's terminal as the distribution target.

Moreover, the image to be synthesized with the screen area in the shot image may be an image different from the projected image. For example, when the synthesizer is installed in the user's terminal, identification information of a 3D image character A is inputted by the user's terminal. Then, although a different character B is originally projected on the screen and recognized by the audience, on the user's terminal, a scene where the character A is synthesized can be viewed.

Moreover, when the projected image is a 3D object; for example, on the basis of information of designating direction of the object inputted by the user, it is possible to generate and synthesize an image, which is the same as the object projected on the screen placed on the stage and has a different direction of shooting (shooting plane for the object).

Moreover, this synthesizer may comprise a synthesizing section for image having same content synthesizing an image having a same content as the image from the projector, and may synthesize the image having the same content as the image from the projector with the screen area in the shot image. In this case, this synthesizing section for image having same content may acquire information of position (position expressed by relative relation with the screen), distance from the screen, shooting direction/angle of the imager, may compute content of the projected image to be shot by the imager on the basis of the information, and may generate an image having the computed content from 3D image data etc. of the projected image. According to the above image system, it is possible to synthesize the image excluding the projected image on the screen with an image having a different or the same content as the projected image.

<Processing Flow of Second Embodiment>

Figure 8:
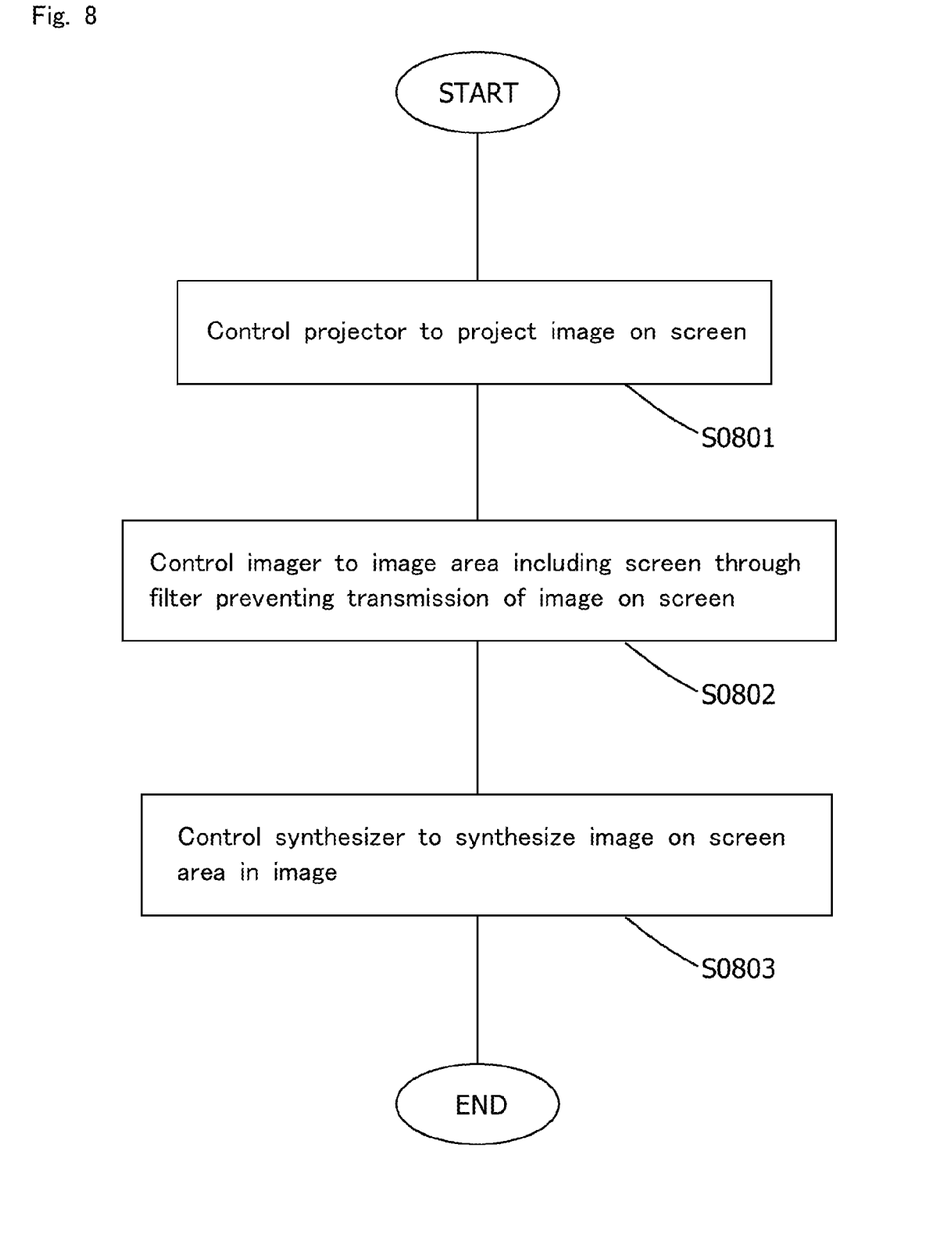
FIG. 8 is a flowchart of the image system of the second embodiment.

FIG. 8 is a flowchart of the image system of the second embodiment. Note that, the following step may be executed by the respective hardware configurations of a computer as above, or may configure a program, which is stored in a medium and is for controlling the computer.

As shown in FIG. 8, at the outset, the projector is controlled to project the image on the screen placed on the stage (a step S0801). Subsequently, the imager is controlled to shoot the area including the screen through a filter for preventing transmission of the projected image on the screen such as a color filter or a polarization filter (a step S0802). Moreover, as described in FIG. 6, the projector may be controlled to intermittently project the image on the screen placed on the stage, and the imager may be controlled to shoot an area including the screen only at a non-projection timing for the intermittently projected image.

Figure 9:
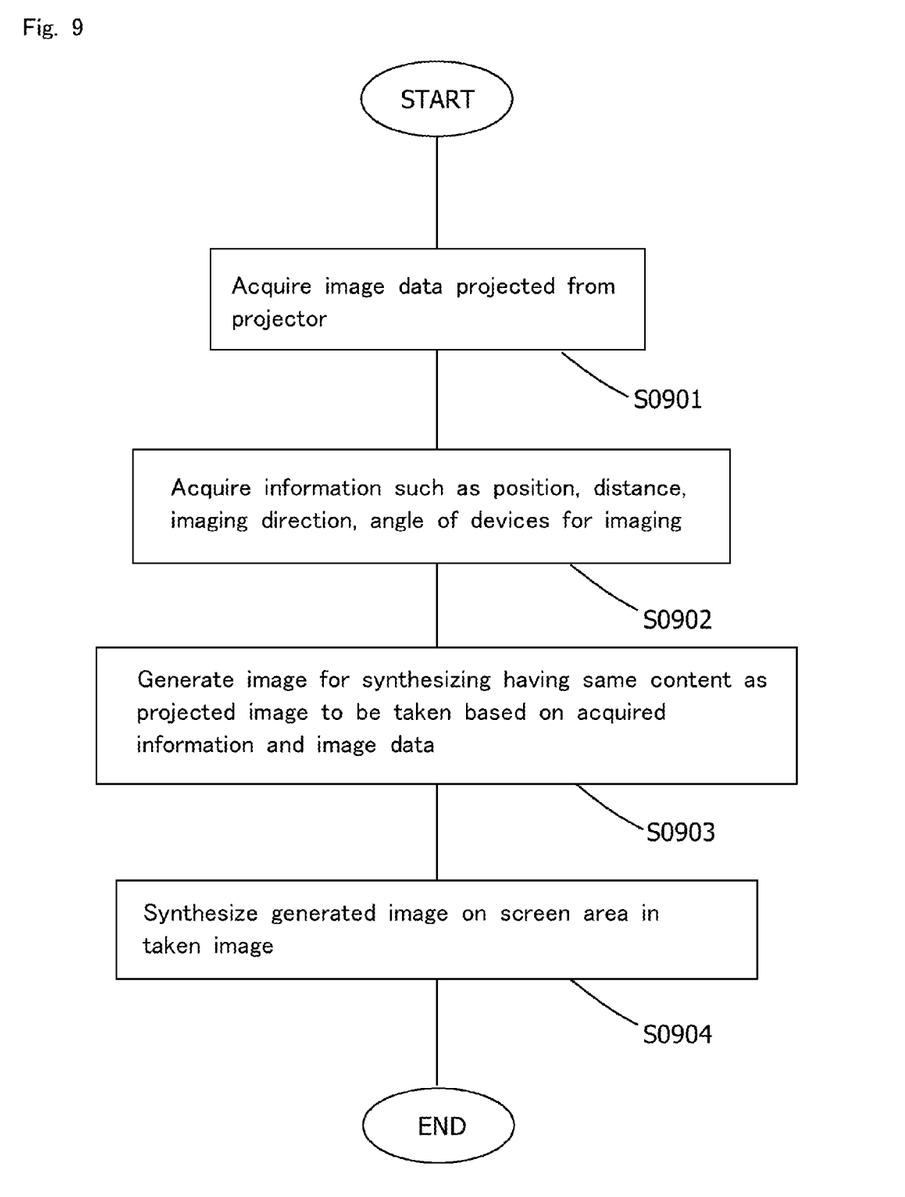
FIG. 9 is a concrete flowchart of the image system of the second embodiment.

Subsequently, for such area in the screen in the shot image, the synthesizer is controlled to synthesize the image (a step S0803). When synthesizing an image having a same content as the image from the projector, as shown in FIG. 9, at the outset, the image projected from the projector (preferably data for displaying 3D image) is acquired (a step S0901), and next, information of position, distance from the screen, shooting direction/angle of the imager is acquired (a step S0902). Subsequently, an image for synthesizing having the content of the projected image to be shot by the imager computed on the basis of such information and the 3D image data is generated (a step S0903), thereby synthesizing the generated image with the area of the screen in the shot image (a step S0904)l <Effects of Second Embodiment>

According to the image system of the second embodiment, it is possible to synthesize the image excluding the projected image on the screen with an image having a different or the same content as the projected image.

Therefore, when synthesizing the different image, it is possible to provide different image between the audience and the viewer of the shot image, and when synthesizing the image having the same content, it is possible to provide the audience with the live atmosphere by the staging, while it is possible to provide the viewer of the shot image with the image including more beautiful projected image.

<<Third Embodiment>>

<Outline of Third Embodiment>

Figure 10:
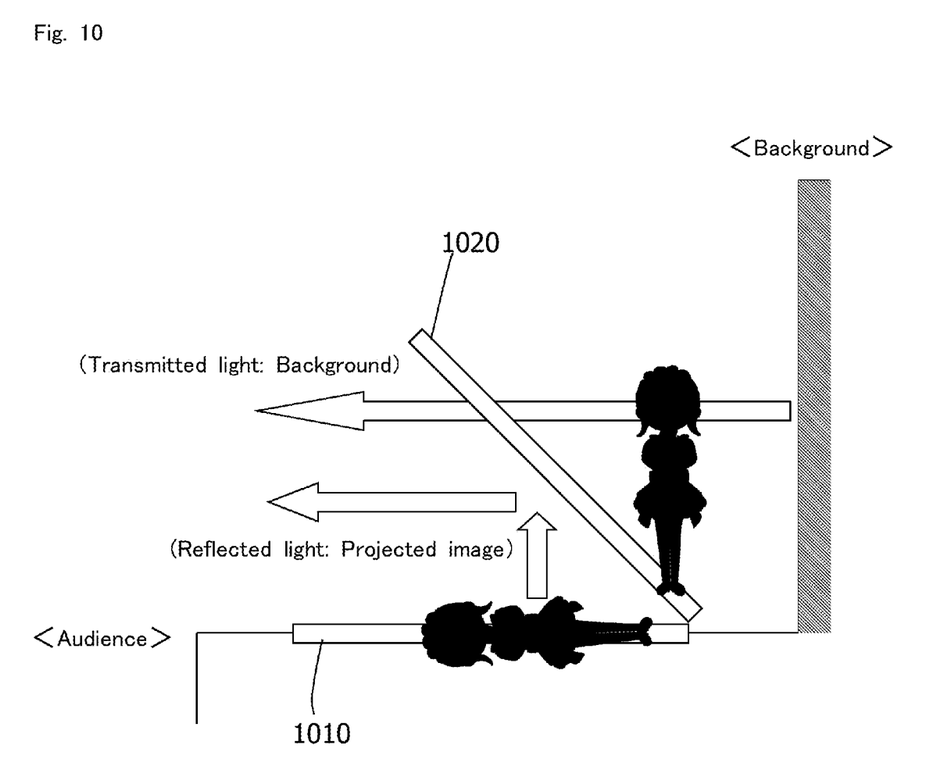
FIG. 10 is a diagram exemplifying image projection by the image system of a third embodiment.

FIG. 10 is a diagram exemplifying image projection by the image system of a third embodiment. Similar to the first embodiment, for example, the image system of the third embodiment can also provide performance with the audience by projecting the image from the projector on the screen placed on the stage.

In a feature of the third embodiment, the screen is a half mirror. Therefore, as shown in FIG. 10, for example, the half minor 1020 is placed on the stage at 45-degree angle. The projector 1010 is placed at a suitable position for the image projection such as a position immediately below the half mirror according to the placement position and angle etc. of the half mirror. Moreover, in such case, as shown in FIG. 10, the projector may be embedded in the stage so as not to be obstruction to the audience.

According to this placement of the half mirror and projector, as shown by arrows in FIG. 10, the image from the projector (mirror-reversed image) is reflected to the front side of the stage by the half mirror, and objects in the rear side of the stage (e.g., background image, stage set, and a back-up band) passes through the half mirror, so that the audience can view a combination of the projected image and the background.

Moreover, the projector in the above outline may be configured by a combination of the projector and a screen for displaying the image from the projector (different from the half mirror), by a display apparatus for displaying, the image, or by other projectors.

<Functional Configuration of Third Embodiment>

Figure 11:
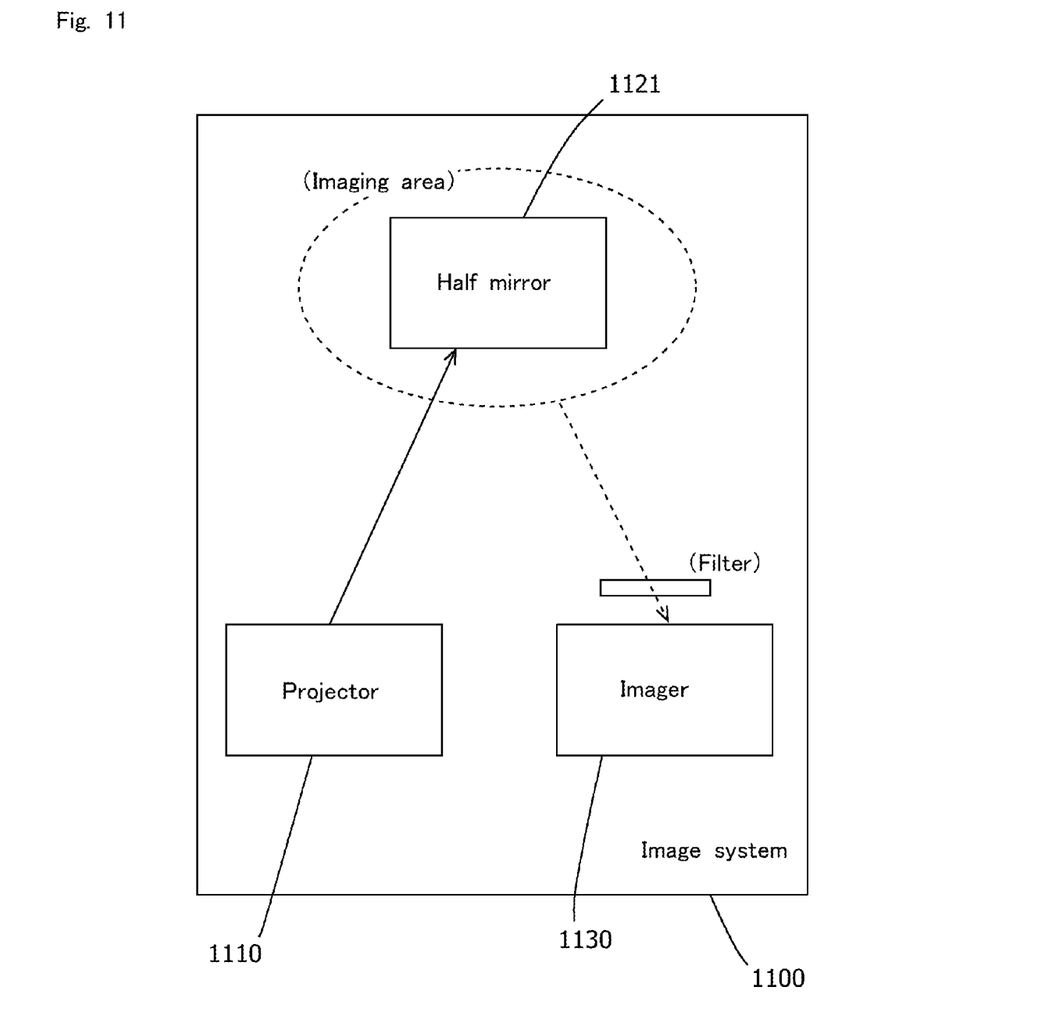
FIG. 11 is a functional block diagram of the image system of the third embodiment.

FIG. 10 is a functional block diagram of an image system of the third embodiment. As shown in FIG. 10, an 'image system' 1000 of the third embodiment is on the basis of the first embodiment, and comprises a 'projector' 1010, a 'screen' 1020, and an 'imager' 1030. The image system of the third embodiment may further comprise other components such as a 'synthesizer', not indicated in figure.

Moreover, in the image system of the third embodiment, the screen is a 'half mirror' 1121. The 'half mirror' is a type of mirror or glass, which is partially reflective and transmissive to the incoming light, and an example of it includes a mirror a thin metal film as a reflector is pasted on an organic glass. Note that although there is a case that the one having the reflection rate and the transmission rate are 1:1, in the third embodiment, the rate is not limited, and any rate, where the image by the reflected light and image by the transmitted light can be provided as viewable image for the audience, may be applied.

Moreover, by utilizing such half mirror as the screen, the image from the projector is reflected to the audience and Objects such as the background image and stage set behind the half minor pass through the half mirror, so that it is possible for the audience to view a combination of the projected image and the background. Moreover, the half mirror has a property of one-way reflection, and a low diffusion rate of the projected light in comparison with a normal screen, thereby reflecting the projected light with a certain level of directivity such as in a direction toward the front-seat, so that although the view angle is narrowed, it is possible to provide the projected image with high brightness and high quality.

Moreover, in the image system of the third embodiment, the projector may be a 'display monitor'. The 'display monitor' is a display apparatus having a function of displaying the image, and examples of it include a liquid-crystal display unit, a plasma display unit, and an organic. EL (Electroluminescence) display unit.

Thus, by utilizing not a 'projector' which directly projects or reflects the light from light source on the screen and display the image, but a 'display monitor' which displays the image, it is possible to archive the following effect. Therefore in the case of the projector, since the projected light is convergent light, when reflecting by the half mirror having the one-way reflectivity, the view angle is extremely narrow, and the projected light can be viewed only in front of the half mirror.

Meanwhile, in the case of using the display monitor as the projector, since the image displayed on the display monitor is projected as the diffusion light, even the half mirror having the one-way reflectivity reflects the light as the diffusion light. Therefore, it is possible to acquire wide view angle, and the projected image can be viewed even at the location of the front of the half mirror.

Moreover, the projected image reflected by the half mirror is polarized, for example, at a predetermined angle, and is not shot by the 'imager' having the filter preventing, transmission of light of the target angle. Therefore, the audience can view the combination of the projected image and the background etc. behind the half mirror (e.g., a combination of vocal performance by a CG character as the projected image and performance by a back-up band on the stage).

Meanwhile, as described above, since the projected image to the half mirror is not included in the image shot by the imager, for example, it is possible to synthesize image of vocal performance by a different vocalist, or high-quality image of the same CG character as the projected image without degradation due to the light decay etc. by the projection and the reflection with the image.

<Effects of Third Embodiment>

According to the image system of the third embodiment, the image from the projector is reflected to the audience and objects such as the background image and stage set behind the half mirror pass through the half minor, so that it is possible for the audience to view a combination of the projected image and the background. Moreover, the half mirror has a property of one-way reflection, and a low diffusion rate of the projected light in comparison with a normal screen, thereby reflecting the projected light with a certain level of directivity such as in a direction toward the front-seat, so that although the view angle is narrowed, it is possible to provide the projected image with high brightness and high quality.

Moreover, by using the display monitor as the projector, since the image displayed on the display monitor is projected as the diffusion light, even the half mirror having the one-way reflectivity reflects the light as the diffusion light. Therefore, it is possible to acquire wide view angle, and the projected image can be viewed even at the location off the front of the half minor.

DESCRIPTION OF REFERENCE NUMERALS

0300 Image system
0310 Projector
0320 Screen
0330 Imager

What is claimed is:

1. An imaging method, the method causing a computer to execute processes, comprising:
   projecting intermittently a first image on a screen by a projector based on source image data;
   imaging the screen and a peripheral area of the screen at a non-projection timing for the intermittently projected first image by an imager so as to obtain captured image data;
   acquiring imager information including:
      an imager relative position of the imager with respect to the screen; and
      an imaging angle of the imager with respect to the screen;
   generating composition image data based on the source image data and the imager information, and
   composing the composition image data with the capture image data so as to generate a composition image, wherein
   the composition image includes a second image representing the composition image data composed in an area corresponding to the screen and a third image representing the captured image data composed in an area corresponding to the peripheral area.

2. The imaging method according to claim 1, wherein the imaging further comprises imaging the screen and the peripheral area at a projection timing through a filter preventing transmission of the first image displayed on the screen.

3. The imaging method according to claim 2, wherein the filter is a shutter for imaging the screen and the peripheral area only at the non-projection timing.

4. The imaging method according to claim 1, wherein the screen is at least partially metal or is coated with metal powder paint.

5. The imaging method according to claim 1, wherein the screen is a semi-transmissive screen.

6. The imaging method according to claim 1, wherein the screen is a half mirror that partially reflects and partially transmits incoming light.

7. The imaging method according to claim 6, wherein the projector is a display monitor so that the first image is displayed on the display monitor.

8. The imaging method according to claim 1, wherein the second image has a same content as the first image.

9. An image system that is configured to execute processes by a processor, the system comprising:
   a projector configured to project a first image on a screen based on source image data;
   an imager configured to shoot the screen and a peripheral area of the screen via a filter, which prevents transmission the first image displayed on the screen, so as to obtain captured image data; and
   a composition unit
      configured to acquire imager information including:
         an imager relative position of the imager with respect to the screen; and
         an imaging angle of the imager with respect to the screen,
      configured to generate composition image data based on the source image data and the imager information, and
      configured to compose the composition image data with the captured image data so as to generate a composition image, wherein
   the composition image includes a second image representing the composition image data composed in an area corresponding to the screen and a third image representing the captured image data composed in an area corresponding to the peripheral area.

10. The image system according to claim 9, wherein
the projector is configured to project the first image intermittently on the screen, and
the filter is a shutter for shooting the screen and the peripheral area at a non-projection timing of the projector.

11. The image system according to claim 9, wherein
the first image projected on the screen is a polarized image under a predetermined condition, and
the filter prevent the polarized image under the predetermined condition from transmitting through the filter.

12. The image system according to claim 9, wherein
the screen is at least partially metal or is coated with metal powder paint.

13. The image system according to claim 9, wherein
the screen is a semi-transmissive screen.

14. The image system according to claim 9, wherein
the screen is a half mirror that partially reflects and partially transmits incoming light.

15. The image system according to claim 9, wherein
the projector is a display monitor so that the first image is displayed on the display monitor.

16. The image system according to claim 9, wherein
the second image has a same content as the first image.

* * * * *